J. W. HILL.

Grain-Meter.

No. 9,213. Reissued May 25, 1880.

Attest

Collin Fordyce

Edgar J. Gross

Inventor.

John W. Hill

THE NORRIS PETERS CO., PHOTO-LITHO., WASHINGTON, D. C.

J. W. HILL.

Grain-Meter.

No. 9,213. Reissued May 25, 1880.

Attest

Collin Ford Jr.

Edgar J. Gross

Inventor.

John W. Hill

THE NORRIS PETERS CO., PHOTO-LITHO., WASHINGTON, D. C.

UNITED STATES PATENT OFFICE.

JOHN W. HILL, OF CINCINNATI, OHIO.

GRAIN-METER.

SPECIFICATION forming part of Reissued Letters Patent No. 9,213, dated May 25, 1880.

Original No. 137,921, dated April 15, 1873. Application for reissue filed September 29, 1879.

*To all whom it may concern:*

Be it known that I, JOHN W. HILL, formerly residing at Dayton, in the county of Montgomery and State of Ohio, and now a resident of Cincinnati, county of Hamilton, and State of Ohio, have invented certain Improvements in Automatic Grain-Weighers, of which the following is a specification.

The nature of my invention consists, first, in an automatic grain-weigher, a grain pan or bucket freely suspended from a steelyard or balance-beam, and provided with devices for retaining it in position for the reception of grain, in combination with a tripping device coming in contact with said retaining devices only after a charge of grain is weighed to permit the discharge thereof, and a positive cut-off operated by but opposing no resistance to the movement of the pan in overbalancing the counterpoise-weight; second, in a novel device for sweeping the grain from the cut-off valve or plate as it is withdrawn from the spout.

Figure 1:
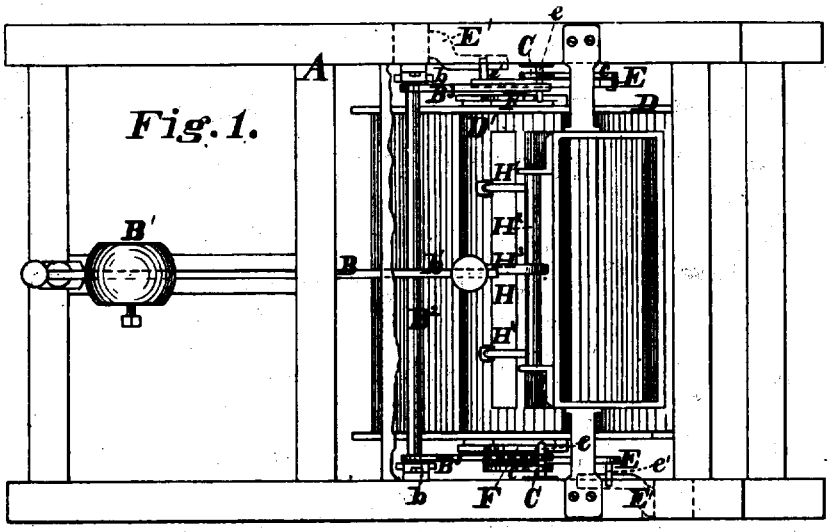
Figure 4:
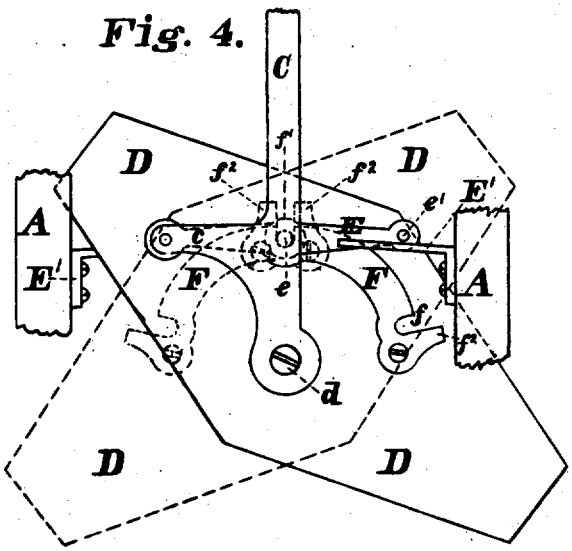
Figure 2:
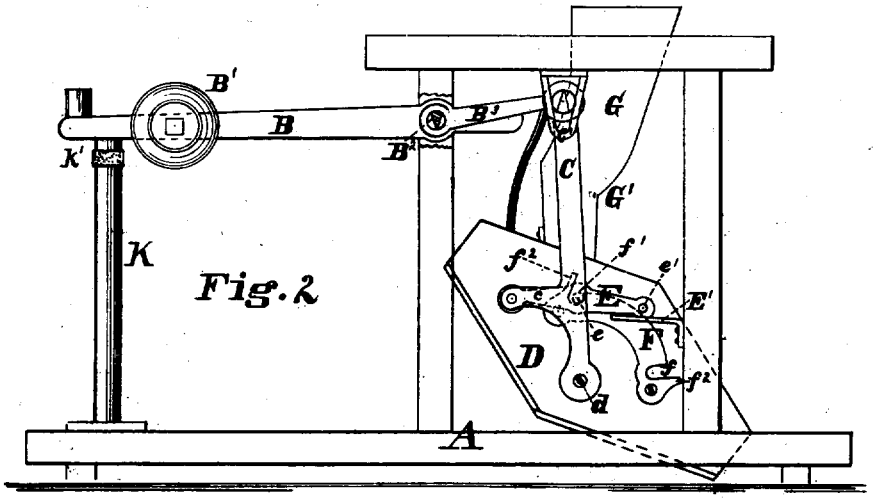
Figure 3:
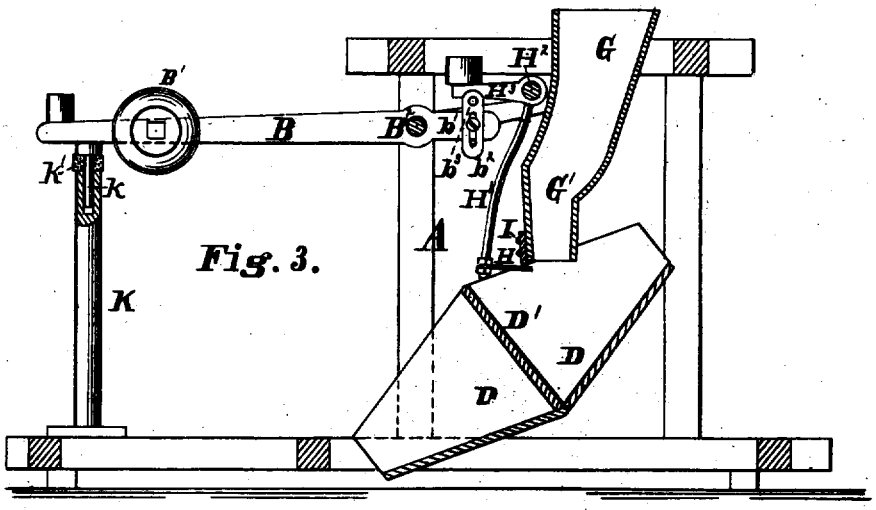

In the accompanying drawings, Figure 1 represents a plan view of my improved machine. Fig. 2 is a side elevation of the same. Fig. 3 is a longitudinal sectional elevation; and Fig. 4 is a detached view of the scale-pan and connected mechanism.

The same letters of reference are used in all the figures in the designation of identical parts.

The various operating parts of the machine are mounted upon a convenient frame-work, A, which is provided with a suitable opening in its base beneath the scale-pan of the balance, to permit of its oscillations and the discharge of the grain.

The long arm B of the beam of the balance carries the usual adjustable sliding weight B′, and is secured firmly to the shaft $B^2$, which terminates at each end in a knife-edge, resting in bearings *b* on the side timbers of the frame. Near each end of this shaft is fastened an arm, $B^3$, extending in an opposite direction to that of the arm B, and constituting the short arms of the beam.

Each arm $B^3$ is provided with a laterally-projecting knife-edge near its outer end, from which the suspension-rods C and C′ are suspended. The scale pan or bucket D is hung between these suspension-rods, the lower ends of which are pivoted to projecting studs *d* on the pan. The latter has a double-inclined bottom, open ends, and a central partition, D′, dividing it into two compartments, which are used alternately for weighing the desired quantity of grain.

The pan is held steadily between the suspension-rods until it has received the weight of grain required, either in the position shown in Fig. 2 or that illustrated in Fig. 3, by means of detents E on the suspension-rods and sectoral catches or cheeks F on the scale-pan.

The detents consist each of a lever, which is pivoted at one end to a projecting arm, *c*, of the suspension-rods, and has projecting from it, about midway of its length, a stud, *e*, which engages automatically either with the notch *f* or the notch *f′* of the corresponding catch F, according to the position of the pan, by falling into the same by gravitation. The extreme free end of each detent is provided with an outwardly-projecting stud, *e′*, overhanging a fixed bracket, E′, on the frame, with which it comes in contact on the descent of the pan, whereby the detent is lifted so as to elevate its stud *e* out of the notch of the catch. The moment this is accomplished the pan is oscillated by the weight of the grain in one of its compartments, and the grain being discharged the pan is at once borne up by the beam, whereby the studs *e′* of the detents are elevated above the brackets E′, so as to allow the detents to swing downward, to cause their studs *e* to fall into the other notches of the catches F. The latter are made of sectoral form, and have an upwardly-projecting shoulder, $f^2$, on the outer side of each notch, for the purpose of limiting the oscillation of the pan.

The descending movement of the pan is limited by stirrups *c′*, in which the knife-edges on the short arms of the beam move, and it is just sufficient to cause the release of the detents from the notches of the catches at the proper times. Without some means for checking this descending motion of the pan it might descend so far as to lift the studs *e* of the detents above the shoulders $f^2$ on the catches, and thus interfere with the proper action of the machine.

The grain is received in a hopper, G, above the oscillating pan. The spout G′ of the hopper is curved, as shown, for the purpose of reducing the momentum of the moving grain to a minimum.

The open end of the spout is controlled by a cut-off, H, fastened to the rods H′ H′, which in turn are secured to a rock-shaft, $H^2$, turning in bearings on the hopper. The rock-shaft carries a weighted arm, $H^3$, the outer end of which rests upon a stud, $b^3$, on the standard $b^2$, which is adjustably secured to an elongation, $b'$, of the arm B. As the beam is turned by the weight of the grain in the scale pan or bucket the cut-off is moved under the spout by the action of the weighted arm $H^3$, stopping the flow of grain during the oscillation of the pan, and on the descent of the arm B the cut-off is drawn back from under the spout by the action of the elongation or arm $b'$ upon the weighted arm $H^3$.

The cut-off is adjustably secured to the rods H′ for vertical adjustment, and its throw is regulated by the adjustable standard $b^2$, to adapt it for operating in different kinds of grain and seeds.

A scraper, I, consisting of a strip of leather, india-rubber, or a brush, is used to sweep off from the cut-off any grain or seeds as it is withdrawn. The downward movement of the arm B of the beam is limited by the post K, which may be provided with a pin, $k$, on top, resting with its head upon an elastic cushion, $k'$, to take up the shock as the beam comes down on the pin.

What I claim is—

1. An automatic grain-weigher consisting, essentially, of a grain pan or bucket, as D, freely suspended from a steelyard or balance-beam, and provided with devices for retaining it in position for the reception of grain, a fixed grain-spout, as G′, discharging directly into the bucket D, and a positive cut-off, as H, to stop the flow of grain when the weighed quantity has been taken, which is closed by the descent of the grain-pan, in combination with tripping devices for causing the discharge of the weighed grain, substantially as specified.

2. The combination of the freely-suspended grain-pan D, suspension-rods C C′, detents E E, cheeks or catches F F, and beams $B^3$ $B^3$, substantially as specified.

3. The combination of the freely-suspended grain-pan hung upon the suspension-rods C C′ of the beam of the balance, fixed catches on said pan, gravitating detents on the suspension-rods, and fixed brackets E′, substantially as specified.

4. The combination of the freely-suspended grain-pan hung upon the suspension-rods C C′ of the beam-balance, the fixed catches on said balance, the gravitating detents on the suspension-rods, fixed brackets E′, the stirrups $c'$, and the shoulders $f^2$ on the cheeks or catches, substantially as and for the purpose set forth.

In testimony whereof I have hereunto set my hand this 27th day of September, 1879.

JOHN W. HILL.

Witnesses:

EDGAR J. GROSS,
COLLIN FORD, Jr.